Patented June 10, 1941

2,245,292

UNITED STATES PATENT OFFICE 2,245,292

PREPARATION OF SULPHANILAMIDO-PYRIDINES

Elmore H. Northey, Bound Brook, and Martin E. Hultquist, North Plainfield, N. J., assignors, by mesne assignments, to American Cyanamid Company, New York, N. Y., a corporation of Maine No Drawing. Application July 22, 1939, Serial No. 285,968

3 Claims. (Cl. 260—296)

This invention relates to sulphanilamidopyridines and nitrosulphonamidopyridines and processes of preparing them.

The compounds of the present invention have the following general formula:

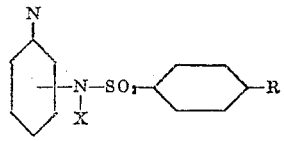

in which X is either hydrogen or an alkali metal and R is an amino, acylamino or a nitro group.

The process of the present invention is an improved method of preparation when R is an amino or acylamino group, such compounds being known heretofore. However, when R is a nitro group, the compounds are new and as such are not limited to the method of preparation of the present invention.

The past methods for the production of sulphanilamidopyridines have usually resulted in only moderately good yields. For example, the process wherein 2-aminopyridine was reacted with N-acetylsulphanilyl chloride in slightly alkaline aqueous solutions to form 2-($N^4$-acetylsulphanilamido)-pyridine which was subsequently hydrolyzed in a strong aqueous sodium hydroxide solution to produce the 2-sulphanilamidopyridine resulted in a product of good quality but the yield was generally only about 40% of the theoretical based on the quantity of the 2-aminopyridine used. When a tertiary alkyl amine solution was used for the first part of the reaction instead of the aqueous alkaline solution, the yields were increased to about 50% of the theoretical. These aqueous alkaline solutions or tertiary alkyl amine solutions act as solvents for the 2-aminopyridine but are not good solvents for the N-acetylsulphanilyl chloride or the reaction product 2-($N^4$-acetylsulphanilamido)-pyridine. Therefore, the reaction must take place in a heterogeneous system and the precipitated reaction product requires filtration prior to hydrolysis to the sulphanilamidopyridine.

According to the present invention, we have found that improved yields and a better quality sulphanilamidopyridine is obtained when the reactions take place in the presence of dioxane which we have found to be a solvent for both the reacting substances and also of the reaction product.

We have found that yields as high as 95% of the theoretical based on the acetylsulphanilyl chloride are obtained when dioxane is used with excess 2-aminopyridine.

When the invention is carried out according to the preferred method, about 95% of the solvent is recovered and can be used over and over again. This is of economic importance because it materially aids in reducing the cost of production. The crude product obtained by this improved method is usually a much higher grade substance than the crude product of past procedures and therefore requires fewer steps in the purification process. This is an important factor as one of the most important fields for these compounds is in chemotherapy.

The present invention is therefore an improvement over prior processes not only because it results in improved yields of sulphanilamidopyridines in purer form but also because it results in a lowered cost of production by incorporating labor and time saving features which eliminate certain intermediate steps.

The present invention will be illustrated by the use of the following specific examples but is not to be limited thereto.

*Example 1*

47 parts (0.5 mol) of 2-aminopyridine were dissolved in 200 parts dry dioxane. 58.5 parts (0.25 mol) of dry N-acetylsulphanilyl chloride were added under agitation and the mixture heated to 95° C. for 15 minutes. The mixture separated into two layers while warm. On cooling under agitation, crystallization occurred. The mass was filtered and washed well with water. The dry weight of 2-($N^4$-acetylsulphanilamido)-pyridine was 108 parts or 92.8% of theory based on the N-acetylsulphanilyl chloride used. It was practically pure as indicated by a melting range of 222–224.5° C. and assay of 100.3%. The color was white where previous methods of synthesis gave a crude product having a yellow or brown color and much lower melting range.

The product as prepared above was hydrolyzed by boiling with 2.5 moles of caustic soda per mole of 2-($N^4$-acetylsulphanilamido-pyridine in aqueous solution. On acidification of the hydrolyzed mixture, 2-sulphanilamidopyridine was obtained in almost quantitative yield. The crude product was white and required but one recrystallization to be of medicinal quality.

*Example 2*

94 parts of 2-aminopyridine (1 mole) was dissolved in 400 parts of dry dioxane and 110.8 parts of p-nitrobenzenesulphonyl chloride added. The temperature was raised to 95° C. and held for 15 minutes. The mixture was diluted with 400 parts of hot water. When crystallization was complete the mixture was filtered and washed well with water. The dried weight was 116.5 parts or 83.4% of theory. The material was recrystallized from 80% dioxane. It crystallized as light yellow needles or prisms which melt with decomposition indefinitely above 170° C. depending on the rate of heating. The soluble alkali metal salts may be prepared by treating with an alkali metal hydroxide solution.

2-(p-nitrobenzenesulphonamido)-pyridine can also be prepared by carrying the reaction out in the presence of other organic solvents such as toluene, pyridine, quinoline and the like.

While specific examples given relate to the production of 2-sulphanilamidopyridine, and 2-(p-nitrobenzenesulphonamido)-pyridine, the process is also applicable to the production of sulphanilamidopyridines, and p-nitrobenzenesulphonamidopyridines in general. For example, the 2-(N$^4$-acetylsulphanilamido)-pyridine, if desired, may be obtained as a final product and need not necessarily be hydrolyzed to the 2-sulphanilamidopyridine.

The di-(sulphanilamido)-pyridines may be prepared according to the present process by substitution of diaminopyridines for the aminopyridines in the examples as given.

The present invention is not limited to the use of N-acetylsulphanilyl chloride as one of its reacting substances but may use other acyl derivatives such as N-propionylsulphanilyl chloride.

When it is desired to use the sulphanilamidopyridine and p-nitrobenzenesulphonamidopyridines of the present invention in a soluble form, this may be accomplished by preparing them in the form of their salts with the alkali metals.

It is claimed:

1. A method of preparing compounds included in the group consisting of sulphanilamidopyridines and p-nitrobenzenesulphonamidopyridines which includes the step of reaction an aminopyridine with a compound selected from the group consisting of N-acylsulphanilyl chlorides and p-nitrobenzenesulphonyl chlorides in the presence of dioxane.

2. A method of preparing sulphanilamidopyridine compounds which comprises reacting an aminopyridine with an N-acylsulphanilyl chloride in the presence of dioxane.

3. A method of preparing a 2-sulphanilamidopyridine which comprises reacting an N-acylsulphanilyl chloride with 2-aminopyridine in dioxane.

ELMORE H. NORTHEY.
MARTIN E. HULTQUIST.

CERTIFICATE OF CORRECTION.

Patent No. 2,245,292. June 10, 1941.

ELMORE H. NORTHEY, ET AL.

It is hereby certified that error appears in the printed specification of the above numbered patent requiring correction as follows: Page 2, second column, line 16, claim 1, for "reaction" read --reacting--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.